United States Patent [19]

Takada et al.

[11] Patent Number: 5,308,911

[45] Date of Patent: May 3, 1994

[54] SECONDARY SUSPENDING AGENT FOR SUSPENSION POLYMERIZATION OF VINYL COMPOUND

[75] Inventors: Shigeki Takada; Hitoshi Maruyama; Naoki Fujiwara; Kazutoshi Terada, all of Kurashiki, Japan

[73] Assignee: Kuraray Co., Ltd., Kurashiki, Japan

[21] Appl. No.: 28,181

[22] Filed: Mar. 9, 1993

[30] Foreign Application Priority Data

Mar. 10, 1992 [JP] Japan .................... 4-051939

[51] Int. Cl.$^5$ .................... C08L 29/04; C08F 2/00; C08F 14/06
[52] U.S. Cl. .................... 524/503; 524/35; 524/556; 524/557
[58] Field of Search .............. 526/203, 344; 525/55; 524/503, 35, 556, 557

[56] References Cited

U.S. PATENT DOCUMENTS 4,258,163 3/1981 Mariasi et al. .................... 526/202

FOREIGN PATENT DOCUMENTS 0123364 10/1984 European Pat. Off. .
0258882 3/1988 European Pat. Off. .
2341600 9/1977 France .
1113350 5/1968 United Kingdom .

Primary Examiner—Joseph L. Schofer
Assistant Examiner—N. Sarofim
Attorney, Agent, or Firm—Oblon, Spivak, McClelland, Maier & Neustadt

[57] ABSTRACT

There are disclosed a secondary suspending agent for suspension polymerization of a vinyl compound (vinyl chloride, etc.) which comprises an aqueous dispersion comprising as the dispersoid, a polyvinyl ester having a degree of hydrolysis of 60 mol% or less, an average degree of polymerization of 4000 or more and an average particle diameter of 100 $\mu$m or less; a suspension stabilizing agent comprising 5 to 70% by weight of the secondary suspending agent (PVA, etc.) and 30 to 95% by weight of a water-soluble high molecular compound having a degree of polymerization of 500 or more, the agent being used for suspension polymerization of a vinyl compound; and a process for producing a vinyl polymer (PVC, etc.) comprising suspension polymerizing a vinyl compound by the use of the above suspension stabilizing agent. Both the agents are well suited for producing vinyl polymer granules enhanced in absorption rate of plasticizer, bulk density, removality of residual monomer and porosity.

4 Claims, No Drawings

SECONDARY SUSPENDING AGENT FOR SUSPENSION POLYMERIZATION OF VINYL COMPOUND

BACKGROUND OF THE INVENTION

1. Field of the Invention

The present invention relates to a secondary suspension agent for suspension polymerization of a vinyl compound, a suspension stabilizing agent for suspension polymerization of a vinyl compound, and a process for producing a vinyl polymer. More particularly, it pertains to a secondary suspension agent and a suspension stabilizing agent each excellent in the capability of exhibiting a high dispersibility even by a small usage and further of rendering vinyl polymer particles porous in the case of suspension polymerization of a vinyl compound such as vinyl chloride for the production of the vinyl polymer, and a process for producing a vinyl polymer using the agents.

2. Description of the Related Arts

In industrially producing a vinyl polymer such as a vinyl chloride resin, there has heretofore been widely practiced a suspension polymerization process in which a vinyl compound such as vinyl chloride monomer is suspended in an aqueous medium in the presence of a suspension stabilizing agent and polymerized by the use of an oil-soluble catalyst. In general, the factors governing the quality of the vinyl polymer to be produced thereby include conversion to polymer, water to monomer ratio, polymerization temperature, kind and amount of catalyst, type of polymerization vessel, agitation rate, kind and amount of the suspension stabilizing agent and the like. It is known that among them, the kind of the suspension stabilizing agent produces a great influence on the aforesaid quality.

The performance required for a suspension stabilizing agent for suspension polymerization of a vinyl compound include that (i) the agent functions so as to exhibit a high dispersibility and make the granulometric distribution of the vinyl chloride polymer granules obtained as sharp as possible by the use of a small amount of the agent; (ii) the agent functions so as to make the polymer granules obtained as uniform and porous as possible to increase the absorption rate of a plasticizer for facilitating the workability and to facilitate the removal of the vinyl chloride monomer residue in the polymer granules to prevent the formation of fish eye, etc. in the molding to be obtained; (iii) the agent functions so as to produce polymer granules having a high bulk density; and the like.

As a suspension stabilizing agent for suspension polymerization of a vinyl compound, there has heretofore been employed a cellulose derivative such as menthylcellulose and carboxymethylcellulose, partially hydrolyzed polyvinyl alcohol or the like, alone or in combination. For example, Japanese Patent Application Laid-Open No. 115890/1977 discloses a process for suspension polymerization of vinyl chloride using as the secondary suspending agent, a partially hydrolyzed polyvinyl alcohol having a saponification value of 300 to 500 (equivalent to a degree of hydrolysis of 37.3 to 69.7 mol%) and an average molecular weight of 10,000 to 30,000 (equivalent to an average degree of polymerization of 140 to 530), and Japanese Patent Application Laid-Open No. 112210/1980 discloses a process for suspension polymerization of vinyl chloride using as the secondary suspending agent, a partially hydrolyzed polyvinyl alcohol having a saponification value of 505 to 600 (equivalent to a degree of hydrolysis of 14.6 to 36.3 mol%) and a viscosity of 0.5 to 2.0 cPs as measured in 4% solution thereof in methanol (equivalent to an average molecular weight of 550 or less). However, the above-mentioned secondary suspending agents have suffered the vital disadvantage that the bulk density of the vinyl chloride polymer granules thus obtained is lowered though some effect is recongnized on the porosity thereof.

In addition, Japanese Patent Application Laid-Open No. 6392/1978 discloses a process for suspension polymerization of vinyl chloride using as the secondary suspending agent, a partially hydrolyzed polyvinyl alcohol having a degree of hydrolysis of 40 to 55 mol% and a viscosity of 5 to 15 mPas as measured in 4% solution thereof in mixed solvents of isopropanol and water (1:1 by mixing ratio) (equivalent to an average molecular weight of 74 to 780). However, the aforesaid secondary suspending agent has suffered the drawback of low capability of making porous the vinyl chloride polymer granules obtained, low absorption rate of plasticizer, or difficulty in removing the vinyl monomer residue.

Moreover, Japanese Patent Application Laid-Open No. 67319/1990 discloses a suspending agent for suspension polymerization of vinyl chloride which comprises a polyvinyl alcohol having a degree of hydrolysis of 80 mol% and an average degree of polymerization of 3000 and a polyvinyl alcohol having a degree of hydrolysis of 40 mol% and an average degree of polymerization of 3000. Japanese Patent Application Laid-Open No. 167745/1981 discloses an aqueous dispersion comprising as the suspending agent, a polyvinyl alcohol having a degree of hydrolysis of 65 mol% or more and an average degree of polymerization of 100 to 3000 and, as the dispersoid, a polyvinyl ester having a degree of hydrolysis of 20 to 65 mol% and an average degree of polymerization of 1000 or less, which aqueous dispersion is usable as the secondary suspending agent for suspension polymerization of vinyl chloride. However, the use of any of the suspending agents as disclosed above can not sufficiently solve the above-stated problems such as low porosity and low bulk density of the vinyl chloride polymer granules.

Further, WO91/15518 discloses the use of an aqueous dispersion comprising as the dispersoid, a polyvinyl ester polymer having an end modified with an ionic group which polyvinyl ester having a degree of hydrolysis of 60 mol% or less and an average degree of polymerization of 50 to 3000 as the secondary suspending agent for suspension polymerization of a vinyl monomer such as vinyl chloride. Nevertheless, a number of difficult problems, especially the low bulk density of the vinyl chloride polymer to be produced remain unsolved in the use of the aforesaid agent.

Furthermore, Japanese Patent Application Laid-Open No. 110797/1977 discloses a secondary suspending agent for suspension polymerization of vinyl chloride which comprises a partially hydrolyzed polyvinyl alcohol having a degree of hydrolysis of 30 to 65 mol% and a degree of polymerization of 60 to 6,000. However, the secondary suspending agent has suffered the defects of low bulk density of the vinyl chloride polymer granules obtained and low absorption rate of plasticizer in spite of some improvement in the porosity thereof.

SUMMARY OF THE INVENTION

Under such circumstances, intensive research and investigation were concentrated by the present inventors on the development of a superior secondary suspending agent and also a superior suspension stabilizing agent each for suspension polymerization while overcoming the above-described problems. As a result, it has been found that an aqueous dispersion comprising as the dispersoid, a polyvinyl ester (hereinafter sometimes abbreviated to "PVES polymer") having a degree of hydrolysis of 60 mol% or less, an average degree of polymerization of 4000 or more and an average particle diameter of 100 μm or less constitutes the secondary suspending agent having the objective performance and at the same time, a suspension stabilizing agent comprising the aforementioned secondary suspending agent is gifted with the intended performance. The present invention has been accomplished on the basis of the above-mentioned finding and information.

Specifically, the present invention provides (A) a secondary suspending agent for suspension polymerization of a vinyl compound which comprises an aqueous dispersion comprising as the dispersoid, a polyvinyl ester having a degree of hydrolysis of 60 mol% or less, an average degree of polymerization of 4,000 or more and an average particle diameter of 100 μm or less; a suspension stabilizing agent for suspension polymerization of a vinyl compound which comprises said secondary suspending agent (A) and (B) a water-soluble polymer having a degree of polymerization of 500 or more, the compounding ratios by weight of the agent (A) and the water-soluble polymer (B) being 5 to 70% and 30 to 95%, respectively expressed in terms of solid content; and a process for producing a vinyl polymer which comprises suspension polymerization of a vinyl compound by the use of said suspension stabilizing agent.

DESCRIPTION OF THE PREFERRED EMBODIMENT

As mentioned hereinbefore, the secondary suspending agent according to the present invention comprises an aqueous dispersion comprising as the dispersoid, a PVES polymer, which has an average degree of polymerization of 4,000 or more, desirably 7,000 or more, more desirably 10,000 or more without specific limitation to the upper limit thereof. However, from the viewpoint of the productional convenience of said PVES polymer, the upper limit thereof is desirably 40,000 or less, more desirably 35,000 or less.

The average degree of polymerization of the PVES polymer is obtained by completely hydrolyzing the PVES polymer, followed by acetylation into polyvinyl acetate, determining the intrinsic viscosity [η] of a solution of the polyvinyl acetate in acetone at 30° C. and expressing with the viscosity-average degree of polymerization (P) as calculated by the following formula:

$$P = ([\eta] \times 10^3 / 7.94)^{(1/0.62)}$$

The degree of hydrolysis of the PVES polymer is 60 mol% or less, desirably 40 mol% or less, more desirably 15 mol% or less, most desirably 0 to 5 mol%, especially 0 mol%. By the term "degree of hydrolysis" as used herein is meant the degree of hydrolysis of the vinyl ester component exclusive of the other component when copolymerized therewith. The degree of hydrolysis can be analyzed by means of a conventional known method such as chemical analysis or nuclear magnetic resonance analysis.

As the vinyl ester unit which constitutes the above-mentioned PVES polymer, the units derived from a variety of vinyl ester compounds are available and exemplified by the unit derived from vinyl acetate, vinyl formate, vinyl propionate, vinyl butyrate, vinyl isobutyrate, vinyl pivalate, vinyl caprylate, vinyl versate or the like. Among them, vinyl acetate unit is preferable from the industrial point of view. It is not precluded at all that the PVES polymer to be used in the present invention has an ionic group, a hydrophilic group and/or a lipophilic group in the molecule up to 10 mol%.

The average particle diameter of the dispersoid is 100 μm or less, desirably 30 μm or less, more desirably 10 μm or less, further desirably 2 μm or less, furthermore desirably 1 μm or less, especially 0.5 μm or less. It is determined by screening analysis when measured as a solid and by light transmission-type, sedimentation-type or dynamic light scattering-type particle size distribution analyzer when measured as an aqueous dispersion.

In the production of the PVES polymer to be used in the present invention, there is adoptable any of the conventional and known methods such as bulk polymerization, solution polymerization, suspension polymerization, emulsion polymerization and dispersion polymerization, among which are preferably solution polymerization, emulsion polymerization and dispersion polymerization from the industrial point of view. The PVES polymer can be produced by any of the polymerization processes including batchwise, semi-batchwise and continuous processes.

In the case where the PVES polymer is a partially hydrolyzed product, it is obtained by hydrolyzing a polyvinyl ester. Specifically there is adoptable the conventional known method such as alkali hydrolysis or acid hydrolysis, but from the industrial view point the most advantageous method is that of methanolysis using sodium hydroxide or sodium methoxide as the catalyst. The hydrolysis temperature is not specifically limited but is preferably 20° to 60° C. with a view to preventing the coloration of the PVES polymer to be produced. The usual amount of sodium hydroxide or sodium methoxide to be used as the catalyst is preferably 0.2 mol or less per one (1) mol of the vinyl ester unit in order to prevent the coloration of the PVES polymer to be obtained and suppress the quantity of sodium acetate as small as possible.

The aqueous dispersion comprising the PVES polymer as the dispersoid according to the present invention may be produced by any of the available methods provided that the dispersoid has an average particle diameter of 100 μm or less. There are available a method in which the aqueous dispersion obtained through suspension polymerization, emulsion polymerization or dispersion polymerization is employed as such; a method in which the aqueous dispersion is hydrolyzed in the form of slurry; a method in which the aqueous dispersion is once isolated as the PVES polymer or the partially hydrolyzed PVES polymer, which thereafter is mechanically pulverized by means of a jet mill or the like; a method in which the aqueous dispersion comprising the dispersoid having an average particle diameter of 100 μm or less is produced by adding thereto an ionic or nonionic surfactant or a publicly known polyvinyl alcohol (hereinafter abbreviated to "PVA") to the extent that the effect of the present invention is not impaired by the addition thereof; and a method in which the aforesaid PVES polymer is once isolated, dissolved in a solvent together with a known suspension stabilizing agent and poured into water under stirring. The concentration of the aqueous dispersion is not specifically limited in any of the aforesaid methods.

In the following, (C) suspension stabilizing agent for suspension polymerization of a vinyl compound according to the present invention will be described. The suspension stabilizing agent according to the present invention comprises (A) secondary suspending agent and (B) water-soluble polymer having a degree of polymerization of 500 or more, the compounding ratios by weight of the agent (A) and the water-soluble polymer (B) being 5 to 70% and 30 to 95%, respectively expressed in terms of solid content.

The water-soluble polymer (B) is not specifically limited provided that the water-soluble polymer has a degree of polymerization of 500 or more and is desirable a conventional suspending agent or a suspension stabilizing agent for suspension polymerization of a vinyl compound and is particularly desirably a PVA having a degree of hydrolysis of more than 60 to 90 mol% and an average degree of polymerization of 500 or more. There is also usable a cellulose derivative such as the conventional hydroxypropylcellulose and methylcellulose. The water-soluble polymer (B) functions as the primary suspending agent. A compounding ratio of the above-mentioned secondary suspending agent (A) in the suspension stabilizing agent (C) of less than 5% by weight results in insufficient effect of adding the agent (A), whereas that exceeding 70% by weight exerts an adverse effect on polymerization stability as the case may be.

The more desirable embodiment of the suspension stabilizing agent (C) according to the present invention includes a suspension stabilizing agent (E) comprising 5 to 100 parts by weight of a PVES polymer (D) having a degree of hydrolysis of 60 mol% or less and an average degree of polymerization of 1000 or less and 100 parts by weight of the aforesaid suspension stabilizing agent (C), respectively expressed in terms of solid content. The degree of hydrolysis of the PVES polymer (D) is 60 mol% or less, desirably 15 to 55 mol%, more desirably 25 to 45 mol%, while the average degree of polymerization of the PVES polymer (D) is 1000 or less, desirably 600 or less, more desirably 150 to 550. The PVES polymer (D) may be modified with a carboxyl group, sulfonyl group, amino group, a salt of any of the groups, or any of various ionic groups.

In the following, the process for producing a vinyl polymer according to the present invention will be described. The process according to the present invention is characterized by the suspension polymerization of a vinyl compound by the use of the suspension stabilizing agent (C) of the present invention.

In the case of suspension polymerization of a vinyl compound by the use of the suspension stabilizing agent (C) of the present invention, for example, suspension polymerization of vinyl chloride alone or a mixture of vinyl chloride as the primary component with a monomer copolymerizable therewith, usually the suspension stabilizing agent is added to a water medium, vinyl chloride alone or a mixture of vinyl chloride with a monomer copolymerizable therewith is dispersed in the water medium thus prepared, and suspension polymerization is effected in the presence of an oil-soluble catalyst. The suspension stabilizing agent may be added to the water medium by adding the secondary suspending agent (A) and the water-soluble polymer (B) separately or in the form of the mixture of the agent (A) and the water-soluble polymer (B).

The use of the suspension stabilizing agent (C) of the present invention enables a high-grade vinyl polymer excellent in plasticizer absorption and monomer removality and minimized in fish eye to be produced even in the case where a heated water of dispersion medium at 40° C. or higher is fed in the polymerization system for the purpose of shortening the temperature raising time. The agent (C) is used in an amount by weight in the rage of usually 0.005 to 1%, preferably 0.01 to 0.5% based on the vinyl compound as the starting material to be polymerized.

The catalyst to be used in suspension polymerization may be any one provided that it is oil-soluble, and is exemplified by benzoyl peroxide; lauroyl peroxide; diisopropyl peroxidicarbonate; 2,2'-azobisisobutyronitrile; 2,2'-azobis-2,4-dimethyl valeronitrile and a mixture thereof. The polymerization temperature is generally selected in the range of 30° to 70° C., approximately.

In suspension polymerization of the vinyl compound by the use of the suspension stabilizing agent (C) of the present invention, a cationic or nonionic surfactant may be used alone or in combination with at least one other surfactant. Moreover, an additive such as polymethylmethacrylate and polystyrene may be added to the suspending stabilizing agent in a small amount.

Examples of the vinyl compound to be polymerized according to the present invention include vinyl chloride alone and a mixed monomer containing vinyl chloride as the primary component by 50% or more by weight. The comonomer to be copolymerized with vinyl chloride is exemplified by a vinyl ester such as vinyl acetate and vinyl propionate; an acrylic ester or a methacrylic ester such as methyl acrylate and ethyl acrylate; an olefin such as ethylene and propylene; maleic anhydride; acrylonitrile; itaconic acid; styrene; vinylidene chloride; vinyl ester; and a monomer copolymerizable with vinyl chloride. The process according to the present invention is applicable to the homopolymerization or copolymerization of the aforementioned vinyl compound not containing vinyl chloride.

The foregoing description is focused mainly on the polymerization of vinyl chloride. However, the secondary suspending agent (A) of the present invention and the suspension stabilizing agent (C) of the same are not limited to the suspension polymerization of vinyl chloride, but are applicable to the suspension polymerization of a vinyl compound such as styrene and methacrylate.

As is clear from the foregoing description, the suspension stabilizing agent of the present invention comprising the secondary suspending agent is superior to the conventional secondary suspending agent and suspension stabilizing agent in that it is highly enhanced in the capability of producing process vinyl polymer granules excellent in absorption rate of plasticizer, bulk density and also facility of removal of vinyl monomer residue. In addition, the vinyl polymer granules obtained by the use of the suspension stabilizing agent of the present invention is excellent in every respect in that they have large granule sizes and a sharp granule size distribution, are minimized in airborne dust of powder in the course of handling and are favorable in the feeding efficiency to a molding machine or the like.

The minimized amount of vinyl monomer residue, that is, a cancerogenic substance in the vinyl chloride polymer granules to be obtained is of significance from the viewpoint of working atmosphere and sanitation, since it can reduce the exposed quantity of vinyl chloride monomer for workers handling vinyl chloride polymer granules.

Further, the enhanced absorption rate of plasticizer in the vinyl chloride polymer granules to be obtained is also of importance from the viewpoint of molding efficiency of vinyl chloride resin, since it can shorten the kneading time of the resin with plasticizer at the time of molding.

Furthermore, importance is attached to the enhanced bulk density of the vinyl chloride polymer granules to be obtained from the viewpoint of molding efficiency of vinyl chloride resin, since it means an enhanced feeding efficiency of the resin to a molding machine.

In what follows, the present invention will be described in more detail with reference to the examples, which however shall not be construed to limit the present invention thereto. In the following examples and comparative examples, the term "part/s" denotes part/s by weight.

EXAMPLES 1 TO 11 AND COMPARATIVE EXAMPLES 1 to 5

By the use of the suspension stabilizing agent (C) consisting of the secondary suspending agent (A) (polyvinyl acetate) and the primary suspending agent (B) (PVA) as shown in Table 1, the suspension polymerization of vinyl chloride was carried out in the following manner.

An aqueous dispersion of the component (A) was prepared by adding the powder of the component (A) to the water under stirring at the time of dissolving the component (B) in the same water. (The same procedure was applied to all examples and comparative examples.)

Specifically, a 30 liters glass-lined autoclave was charged with 50 parts of deionized water, a prescribed amount of 2% by weight aqueous solution of the primary suspending agent (B) (PVA) as shown in Table 1, a prescribed amount of 2% by weight aqueous dispersion of the secondary suspending agent (A) (polyvinyl acetate) as shown in Table 1 and 0.009 part of 50% by weight solution of diisopropyl peroxidicarbonate in toluene, deaerated to a pressure of 50 mmHg to remove oxygen and further charged with 30 parts of vinyl chloride monomer to proceed with polymerization at a raised temperature of 57° C. under stirring.

The pressure in the autoclave was 8.5 kg/cm$^2$ G at the beginning of polymerization but was lowered to 4.5 kg/cm$^2$ G after 7 hours from the beginning thereof, when the polymerization was stopped and the unreacted vinyl chloride monomer was purged to collect the content in the autoclave, followed by dehydrating and drying the product.

As a result, the vinyl chloride resin was obtained in a polymerization yield of 88% and had an average degree of polymerization of 1050. The physical properties and amount used of the suspension stabilizing agent and the performance of the vinyl chloride resin thus obtained are given in Table 1.

TABLE 1-1

| | Primary suspending agent (B) | | | Secondary suspending agent (A) | | | |
|---|---|---|---|---|---|---|---|
| | degree of hydrolysis (mol %) | average degree of polymerization | amount used (part) | degree of hydrolysis (mol %) | average degree of polymerization | average particle diameter (μm) | amount used (part) |
| Example 1 | 78 | 700 | 0.09 | 58 | 8000 | 32 | 0.01 |
| Example 2 | 78 | 700 | 0.08 | 42 | 4500 | 68 | 0.02 |
| Example 3 | 78 | 700 | 0.08 | 38 | 6800 | 12 | 0.02 |
| Example 4 | 85 | 1800 | 0.08 | 38 | 7200 | 8 | 0.02 |
| Example 5 | 85 | 1800 | 0.08 | 16 | 17000 | 2 | 0.02 |
| Example 6 | 85 | 1800 | 0.08 | 13 | 4500 | 1 | 0.02 |
| Example 7 | 85 | 1800 | 0.08 | 13 | 7200 | 0.1 | 0.02 |
| Example 8 | 70 | 1400 | 0.05 | 2 | 22000 | 28 | 0.05 |
| Example 9 | 70 | 1400 | 0.13 | 0 | 8000 | 0.08 | 0.07 |
| Example 10 | 70 | 1400 | 0.08 | 0 | 8000 | 0.05 | 0.02 |
| Example 11 | 75 | 1700 | 0.08 | 0 | 20000 | 0.02 | 0.02 |
| Comparative Example 1 | 78 | 700 | 0.08 | 62 | 8000 | 22 | 0.02 |
| Comparative Example 2 | 78 | 700 | 0.02 | 62 | 8000 | 22 | 0.08 |
| Comparative Example 3 | 85 | 1800 | 0.08 | 13 | 7200 | 130 | 0.02 |
| Comparative Example 4 | 85 | 1800 | 0.08 | 0 | 18000 | 250 | 0.02 |
| Comparative Example 5 | 85 | 1800 | 0.08 | 0 | 18000 | 800 | 0.02 |

The amounts of components (A) and (B) used herein are each based on 100 parts of the vinyl chloride monomer, respectively expressed in terms of solid content.

TABLE 1-2

| | Performance of vinyl chloride resin | | | |
|---|---|---|---|---|
| | average granule diameter (μm) | bulk density | plasticizer absorption (minute) | vinyl chloride monomer residue (ppm) |
| Example 1 | 150 | 0.598 | 3.5 | 0.3 |
| Example 2 | 130 | 0.595 | 3.0 | 0.3 |
| Example 3 | 145 | 0.597 | 2.8 | 0.3 |
| Example 4 | 140 | 0.599 | 2.8 | 0.3 |
| Example 5 | 128 | 0.601 | 2.5 | 0.2 |
| Example 6 | 142 | 0.602 | 2.0 | 0.18 |
| Example 7 | 131 | 0.602 | 1.5 | 0.15 |
| Example 8 | 150 | 0.615 | 1.5 | 0.10 |
| Example 9 | 139 | 0.611 | 1.0 | 0.10 |
| Example 10 | 130 | 0.610 | 1.0 | 0.09 |
| Example 11 | 135 | 0.620 | 1.0 | 0.08 |
| Comparative Example 1 | 132 | 0.551 | 4.8 | 8.5 |
| Comparative Example 2 | 250 | 0.480 | 15.0 | 15.2 |
| Comparative Example 3 | 142 | 0.579 | 4.0 | 5.8 |
| Comparative Example | 130 | 0.550 | 8.6 | 6.8 |

TABLE 1-2-continued

| | Performance of vinyl chloride resin | | | |
|---|---|---|---|---|
| | average granule diameter (μm) | bulk density | plasticizer absorption (minute) | vinyl chloride monomer residue (ppm) |
| Example 4 Comparative Example 5 | 135 | 0.521 | 12.5 | 10.1 |

EXAMPLES 12 TO 20 AND COMPARATIVE EXAMPLE 6

By the use of the suspension stabilizing agent (C) consisting of the secondary suspending agent (A) and the primary suspending agent (B) as shown in Table 2, the suspension polymerization of vinyl chloride was carried out in the following manner.

Specifically, a 30 liters glass-lined autoclave was charged with a prescribed amount of 2% by weigh aqueous solution of the primary suspending agent (B) (PVA) as shown in Table 2, a prescribed amount of 2% by weight aqueous dispersion of the secondary suspending agent (A) (polyvinyl acetate) as shown in Table 2 and 0.009 part of 50% by weight solution of diisopropylperoxidicarbonate in toluene, deaerated to a pressure of 50 mmHg to remove oxygen and further charged with 30 parts of vinyl chloride monomer and 45 parts of deionized water heated to 63° C. to proceed with polymerization at a controlled temperature of 57° C. under stirring.

The pressure in the autoclave was 8.5 kg/cm² G at the beginning of polymerization but was lowered to 4.5 kg/cm² G after 7 hours from the beginning thereof, when the polymerization was stopped and the unreacted vinyl chloride monomer was purged to collect the content in the autoclave, followed by dehydrating and drying the product.

As a result, the vinyl chloride resin was obtained in a polymerization yield of 88% and had an average degree of polymerization of 1050. The performance of the vinyl chloride resin thus obtained is given in Table 2.

TABLE 2-1

| | Primary suspending agent (B) | | | Secondary suspending agent (A) | | | |
|---|---|---|---|---|---|---|---|
| | degree of hydrolysis (mol %) | average degree of polymerization | amount used (part) | degree of hydrolysis (mol %) | average degree of polymerization | average particle diameter (μm) | amount used (part) |
| Example 12 | 65 | 1800 | 0.06 | 58 | 4200 | 86 | 0.02 |
| Example 13 | 70 | 700 | 0.06 | 23 | 7100 | 1.8 | 0.02 |
| Example 14 | 70 | 700 | 0.06 | 19 | 7100 | 1.0 | 0.02 |
| Example 15 | 80 | 2000 | 0.06 | 15 | 4200 | 8 | 0.04 |
| Example 16 | 80 | 2000 | 0.06 | 3 | 4500 | 11 | 0.06 |
| Example 17 | 80 | 2000 | 0.06 | 3 | 6800 | 9 | 0.06 |
| Example 18 | 85 | 2800 | 0.06 | 3 | 7100 | 1.0 | 2.0 |
| Example 19 | 72 | 720 | 0.06 | 0 | 4500 | 1.8 | 0.04 |
| Example 20 | 72 | 720 | 0.06 | 0 | 25000 | 0.02 | 0.04 |
| Comparative Example 6 | 72 | 720 | 0.06 | 55 | 550 | 10 | 0.02 |

The amounts of components (A) and (B) used herein are each based on 100 parts of the vinyl chloride monomer, respectively expressed in terms of solid content.

TABLE 2-2

| | Physical properties of vinyl chloride resin | | | |
|---|---|---|---|---|
| | average granule diameter (μm) | fish eye (number/ 100 cm²) | plasticizer absorption (minute) | vinyl chloride monomer residue (ppm) |
| Example 12 | 150 | 38 | 4.8 | 2.0 |
| Example 13 | 132 | 35 | 3.8 | 2.0 |
| Example 14 | 141 | 22 | 3.5 | 2.0 |
| Example 15 | 142 | 20 | 3.0 | 1.7 |
| Example 16 | 138 | 19 | 2.5 | 0.5 |
| Example 17 | 135 | 15 | 2.5 | 0.4 |
| Example 18 | 135 | 13 | 2.0 | 0.4 |
| Example 19 | 142 | 6 | 1.5 | 0.2 |
| Example 20 | 145 | 5 | 1.5 | 0.1 |
| Comparative Example 6 | 120 | 100 | 12.5 | 5.0 |

EXAMPLES 21 TO 25 AND COMPARATIVE EXAMPLES 7 TO 8

The procedure in Examples 1 to 11 was repeated to carry out suspension polymerization of vinyl chloride except that there were employed the primary suspending agent (B) (PVA) and the secondary suspending agent (A) (polyvinyl acetate each as shown in Table 3. The performance of the vinyl chloride resin thus obtained is given in Table 3.

TABLE 3-1

| | Primary suspending agent (B) | | | Secondary suspending agent (A) | | | |
|---|---|---|---|---|---|---|---|
| | degree of hydrolysis (mol %) | average degree of polymerization | amount used (part) | degree of hydrolysis (mol %) | average degree of polymerization | average particle diameter (μm) | amount used (part) |
| Example 21 | 78 | 1000 | 0.06 | 0 | 8000 | 0.05 | 0.03 |
| Example 22 | 78 | 1000 | 0.06 | 0 | 8000 | 0.05 | 0.03 |
| Example 23 | 78 | 1000 | 0.06 | 0 | 8000 | 0.05 | 0.03 |
| Example 24 | 78 | 1000 | 0.06 | 0 | 8000 | 0.05 | 0.03 |
| Example 25 | 78 | 1000 | 0.06 | 0 | 8000 | 0.05 | 0.03 |
| Comparative Example 7 | 78 | 1000 | 0.06 | — | — | — | — |
| Comparative Example 8 | 78 | 1000 | 0.06 | — | — | — | — |

The amounts of components (A) and (B) used herein are each based on 100 parts of the vinyl chloride monomer, respectively expressed in terms of solid content.

TABLE 3-2

| | Secondary suspending agent (D) other than component (A) | | | | |
|---|---|---|---|---|---|
| | degree of hydrolysis (mol %) | degree of polymerization | average particle diameter (μm) | amount used (part) | modification |
| Example 21 | 58 | 540 | 3.1 | 0.03 | none |
| Example 22 | 42 | 380 | 0.12 | 0.03 | end being modified with carboxyl group |
| Example 23 | 35 | 230 | 0.10 | 0.03 | modified by random copolymerization with 1 mol % of itaconic acid |
| Example 24 | 16 | 230 | 0.08 | 0.03 | modified by random copolymerization with 0.3 mol % of sulfonic acid |
| Example 25 | 5 | 160 | 4.5 | 0.03 | none |
| Comparative Example 7 | 42 | 380 | 0.15 | 0.03 | end being modified with carboxyl group |
| Comparative Example 8 | 35 | 3400 | 3.0 | 0.03 | none |

The amount of component (D) used herein is based on 100 parts of the vinyl chloride monomers expressed in terms of solid content.

TABLE 3-3

| | Physical properties of vinyl chloride resin | | | |
|---|---|---|---|---|
| | average granule diameter (μm) | bulk density | plasticizer absorption (minute) | vinyl chloride monomer residue (ppm) |
| Example 21 | 132 | 0.610 | 1.0 | 0.05 |
| Example 22 | 155 | 0.620 | 0.8 | 0.04 |
| Example 23 | 157 | 0.620 | 0.9 | 0.04 |
| Example 24 | 148 | 0.621 | 1.0 | 0.04 |
| Example 25 | 143 | 0.613 | 1.0 | 0.07 |
| Comparative Example 7 | 142 | 0.548 | 4.8 | 0.4 |
| Comparative Example 8 | 128 | 0.522 | 8.7 | 3.2 |

The results in Tables 1, 2, and 3 were obtained by the measurements according to the following methods.

(1) Average granule diameter

Average granule diameter was measured by dry sieving analysis, using a Tyler standard wire mesh sieve.

(2) Bulk density

Bulk density was measured according to JIS K-6721 (1959).

(3) Plasticizer absorption

Using a planetary mixer connected to a plastograph, 100 parts of vinyl chloride resin and 50 parts of dioctyl phthalate were fed in a vessel maintained at 80° C. with kneading, and the kneading torque was measured after each elapsed time. The plasticizer absorption was expressed by kneading period of time until the kneading torque went down.

(4) Vinyl chloride monomer residue

The content of vinyl chloride monomer in the vinyl chloride resin was determined by head-space gas chromatography.

(5) Average particle diameter of secondary suspending agent was measured by means of ELS-800 (produced by Otsuka Electronics Co., Ltd., in the case of smaller than 1 μm in particle diameter), CAPA-700 (produced by Horiba Ltd., in the case of 1 to 30 μm) or SKC-2000S (produced by Seishin Enterprise Co., Ltd. in the case of larger than 30 μm).

(6) Fish eye

A blended composition consisting of 100 parts by weight of the vinyl chloride resin obtained through polymerization, one (1) part by weight of tribasic lead sulfate, 1.5 part by weight of lead stearate, 0.2 part by weight of titanium dioxide, 0.1 part by weight of carbon black and 50 parts by weight of dioctyl phthalate in an amount of 25 g was kneaded with a roll at 145° C. for 5 minutes and batched off into a sheet with 0.2 mm thickness. The number of fish eyes was expressed by the number of transparent particles per 100 cm$^2$ of the sheet.

What is claimed is:

1. A secondary suspending agent for suspension polymerization of a vinyl compound which comprises an aqueous dispersion comprising as the dispersoid, a polyvinyl ester having a degree of hydrolysis of 60 mol% or less, an average degree of polymerization of 4000 or more and an average particle diameter of 100 μm or less.

2. The secondary suspending agent according to claim 1 wherein the polyvinyl ester has a degree of hydrolysis of 0 mol%.

3. A suspension stabilizing agent (C) for suspension polymerization of a vinyl compound which comprises the secondary suspending agent (A) as set forth in claim 1 and (B) a water-soluble polymer having a degree of polymerization of 500 or more, the compounding ratios by weight of the agent (A) and the compound (B) being 5 to 70% and 30 to 95%, respectively expressed in terms of solid content.

4. A suspension stabilizing agent for suspension polymerization of a vinyl compound which comprises the suspension stabilizing agent (C) as set forth in claim 3 and (D) a polyvinyl ester polymer having a degree of hydrolysis of 60 mol% or less and an average degree of polymerization of 1000 or less, the compounding ratio by weight of the polymer (D) being 5 to 100 parts based on 100 parts of the agent (C) expressed in terms of solid content.

* * * * *